United States Patent
Dick et al.

(10) Patent No.: US 7,158,802 B2
(45) Date of Patent: Jan. 2, 2007

(54) METHOD AND APPARATUS FOR PROVIDING A HIGHLY RELIABLE ACK/NACK FOR TIME DIVISION DUPLEX (TDD) AND FREQUENCY DIVISION DUPLEX (FDD)

(75) Inventors: Stephen G. Dick, Nesconset, NY (US); Younglok Kim, Seoul (KR); Nader Bolourchi, Larchmont, NY (US); Sung-Hyuk Shin, Fort Lee, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 677 days.

(21) Appl. No.: 10/369,837

(22) Filed: Feb. 19, 2003

(65) Prior Publication Data

US 2004/0009780 A1 Jan. 15, 2004

Related U.S. Application Data

(60) Provisional application No. 60/357,948, filed on Feb. 19, 2002.

(51) Int. Cl.
*H04B 7/00* (2006.01)
*G08B 5/22* (2006.01)
*G08B 25/00* (2006.01)

(52) U.S. Cl. ............... 455/509; 340/7.43; 340/298

(58) Field of Classification Search ................ 455/522, 455/69, 456.2, 513, 67.7, 68, 70, 115.2, 126, 455/115.3, 134, 135, 161.3, 197.1, 283, 226.2, 455/226.3, 277.2; 370/333, 496, 524; 340/7.43, 340/298
See application file for complete search history.

(56) References Cited

U.S. PATENT DOCUMENTS

| | | | |
|---|---|---|---|
| 4,905,234 A | | 2/1990 | Childress et al. |
| 5,377,192 A | | 12/1994 | Goodings et al. |
| 5,537,414 A | | 7/1996 | Takiyasu et al. |
| 5,828,677 A | * | 10/1998 | Sayeed et al. ............. 714/774 |
| 6,195,782 B1 | * | 2/2001 | Rahmatullah et al. ...... 714/796 |
| 2001/0053697 A1 | * | 12/2001 | Nakada ...................... 455/456 |
| 2003/0123400 A1 | * | 7/2003 | Kloos et al. ................ 370/317 |
| 2005/0169198 A1 | * | 8/2005 | Zeira et al. ................. 370/280 |

\* cited by examiner

*Primary Examiner*—Quochien B. Vuong
*Assistant Examiner*—Dominic E. Rego
(74) *Attorney, Agent, or Firm*—Volpe and Koenig, P.C.

(57) ABSTRACT

An ACK/NACK method and system for use in time division duplex (TDD) and frequency division duplex (FDD) systems. In high speed downlink packet access (HSDPA), based on the assignment of timeslots for the high speed shared information channel (HS-SICH), each user equipment (UE) can be assigned two (2) different channelization codes. It is then possible to adopt the signaling convention that one code represents acknowledge error-free (Ack) and the other code shall represent acknowledge error condition (Nack). The Node B is able to distinguish the presence of the transmitted channelization code as opposed to the channelization code which is not transmitted. The probability of error, using this invention is an order of a magnitude smaller than if the Ack/Nack were signaled using typical modulation techniques.

8 Claims, 1 Drawing Sheet

Figure 1:
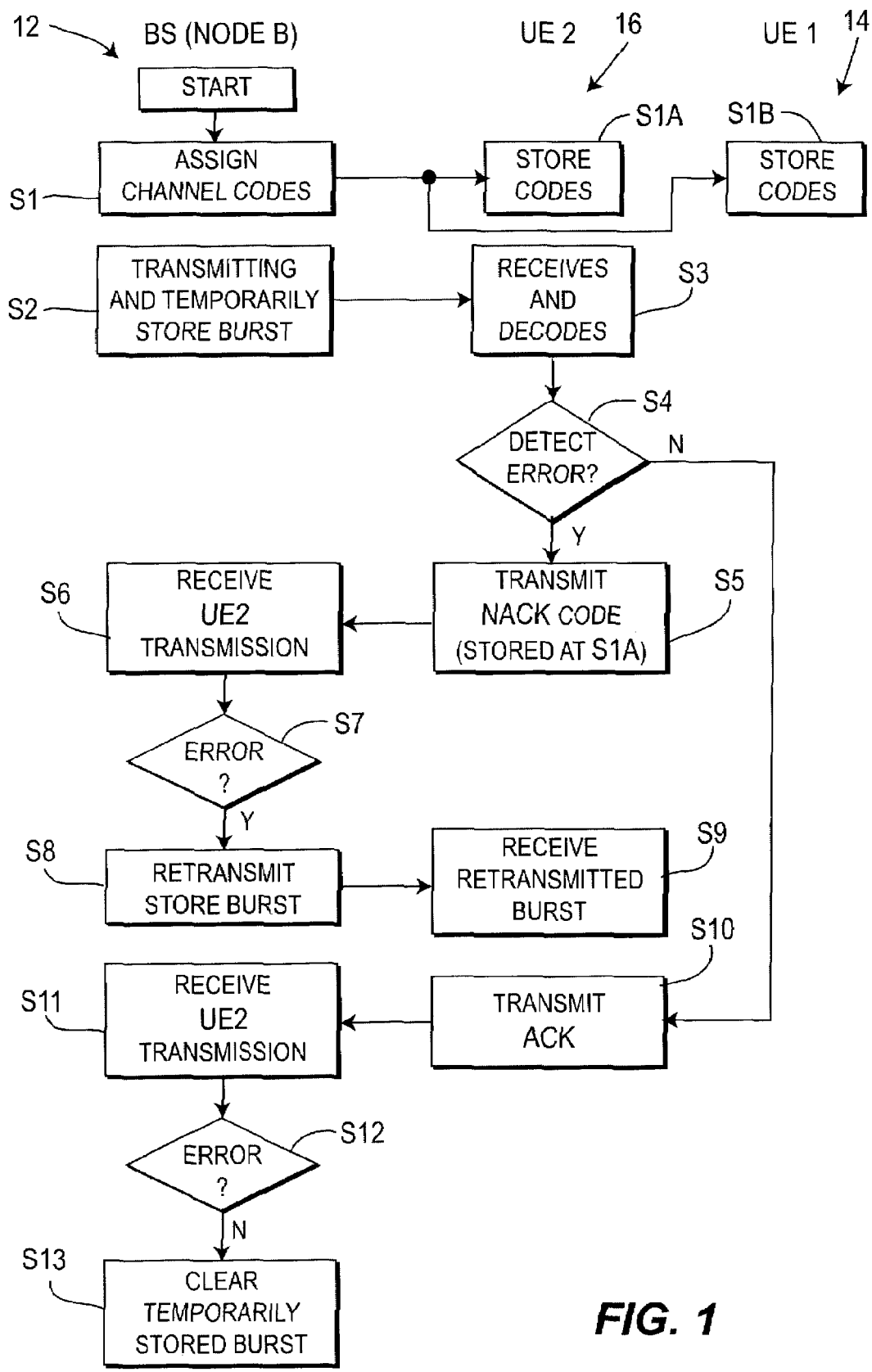

METHOD AND APPARATUS FOR PROVIDING A HIGHLY RELIABLE ACK/NACK FOR TIME DIVISION DUPLEX (TDD) AND FREQUENCY DIVISION DUPLEX (FDD)

CROSS REFERENCE TO RELATED APPLICATION(S)

This application claims priority from U.S. provisional application No. 60/357,948 filed on Feb. 19, 2002, which is incorporated by reference as if fully set forth herein.

FIELD OF INVENTION

The present invention relates to the field of wireless communications. More specifically, the present invention relates to method and apparatus for providing a highly reliable Ack/Nack signal in the return channel, referred to as the high speed shared information channel (HS-SICH) in high-speed downlink packet access (HSDPA).

BACKGROUND

In HSDPA it is critical to have a highly reliable Ack/Nack signal in the return (uplink) channel, referred to as the High Speed Shared Information Channel HS-SICH. It is especially critical to recognize the Nack, because this is the message that indicates to the Network (the Node B) that it is required to retransmit data, which has failed to be correctly processed.

SUMMARY OF THE INVENTION

During a given time, up to eight (8) UEs are each assigned two (2) unique channelization codes, respectively representing ACK and NACK signals, which are easily distinguished from one another by the network (Node B).

BRIEF DESCRIPTION OF THE DRAWING(S)

The sole FIGURE is a simplified system diagram useful in explaining the technique and apparatus of the present invention.

DETAILED DESCRIPTION OF THE PREFERRED EMBODIMENT(S)

Within a time division duplex (TDD) cell, for any given slot, there are 16 channelization codes available, both for uplink and downlink. In the HSDPA application, a given timeslot will be assigned for the HS-SICH. Without introducing a serious operational limitation, it can be assumed that no more than eight user equipments (8 UEs) will be receiving highspeed data at a given time. Therefore, no more than eight (8) UEs will be transmitting uplink in the assigned HS-SICH timeslot.

Therefore, each UE can be assigned two (2) channelization codes. It is then possible to adopt the signaling convention that one code represents ACK (previous downlink data burst was successful) and the other code shall represent Nack (previous downlink data burst was unsuccessful). Furthermore, the well documented set of additional uplink control information, e.g. Channel Quality Indicator (CQI), and Transmit Power Control (TPC) can be modulated onto the selected channelization code.

The Node B is easily and readily able to distinguish the presence of the transmitted channelization code as opposed to the other channelization code, which is not transmitted. The probability of error, employing the technique of the present invention, will be an order of magnitude smaller than if the Ack/Nack were signaled using typical modulation techniques.

This invention is particularly well suited to TDD, because there is no additional cost associated with the allocation of all sixteen (16) codes in the slot. It is also noted that, even though sixteen (16) codes are allocated, with eight (8) UEs transmitting in the slot, only eight (8) codes will be used at any one time. This invention may also be used in frequency division duplex (FDD) transmissions for signaling Ack/Nack for HSDPA.

The sole FIGURE of the application shows a system 10 comprised of a base station (Node B) 12 and a plurality of user equipments (UEs). In the example given, only two (2) user equipments (UEs) are shown for purposes of simplicity, it being understood that the number serviced by the BS 12 may be quite substantial. In the example, the first and second UEs 14 and 16 are serviced by the BS which can serve one or multiple cells.

BS 12, at step S1, assigns each UE a pair of channelization codes wherein each of the pair of channelization codes assigned to each UE 14 and 16 differ from one another. Each code of the channelization code pairs are respectively designated for use to represent an ACK and a NACK condition. UE2–16 and UE1–14 store their assigned code pairs, at S1A and S1B.

BS 12, at step S2 transmits a burst such as burst type 1 to a number of UEs. In the example given, BS 12, at step S2, transmits to UE2–16. UE2–16, at step S3 receives and decodes the burst. At step S4 UE2–16 determines if there is an error present in the reception. If an error is detected, the routine branches to step S5 causing the channelization code assigned as a Nack code to be transmitted to the BS12. BS12, at step S6, receives the code and, if an error channelization code (Nack) is detected, at step S7, the routine branches to step S8 to retransmit the temporarily stored burst to UE2–16 which receives the retransmitted burst at step S9.

Assuming the burst received by UE2–16 at step S3 is error free, UE2–16, at step S4 branches to step S10 to transmit the channelization code assigned to UE2–16 to designate an ACK condition. BS12, at step S11, receives this channelization code representing an ACK signal and, at step S12, detecting that there is no error, branches to step S13 to clear the burst which was temporarily stored.

Although not shown for purposes of simplicity, it should be understood that up to six (6) additional UEs beyond UE1–14 and UE2–16, may be communicating with BS12 at the same time.

As was described hereinabove, the maximum number of UEs will be transmitting only one code (either an Ack or an Nack code) at one time, thus limiting the total number of channelization codes transmitted at one time to eight (8). The technique described herein above is well suited to both TTD and FDD.

What is claimed is:

1. A method for providing a highly reliable acknowledge-correct/acknowledge-error (ACK/NACK) capability for use by one or more user equipments (UEs) in a wireless network, comprising:

a base station (BS) providing a plurality of channelization codes for use in a time slot, each of said channelization codes being different from one another;

said BS assigning two (2) different of said channelization codes to each of said one or more UEs; and said BS designating one (1) of the two (2) different channelization codes assigned to each UE as an ACK signal and the other one of the two channelization codes as a NACK signal, said BS sending said ACK and NACK signal codes to said UE, and said UE receiving and storing said codes for subsequent use.

2. The method of claim 1 wherein the number of different channelization codes provided by the BS is 16.

3. The method of claim 1 further comprising:

said base station transmitting a burst to said at least one UE and temporarily storing the burst;

said UE determining whether the transmitted burst contains an error; and in the case of an error, said UE transmitting to the BS the channelization code assigned to the UE as a NACK signal; and in the case of no error, said UE transmitting to the BS the channelization code assigned to the UE as an ACK signal.

4. The method of claim 3 further comprising:

said BS receiving the signal sent by the UE and determining whether the signal is an ACK or a NACK;

in the case of an ACK, said BS discarding the stored burst; and in the case of a NACK, said BS retrieving the stored burst and retransmitting the burst to the UE.

5. Apparatus for providing a highly reliable acknowledge-correct/acknowledge-error (ACK/NACK) capability for use by one or more user equipments (UEs) in a wireless network, comprising:

a base station (BS) having:

a channelization code provider for providing a plurality of channelization codes for use in a time slot, each of said channelization codes being different from one another;

a code assigner for assigning two (2) different of said channelization codes to each of said UEs; and a code designator for designating one (1) of the two (2) channelization codes as an ACK signal and the other one of the two channelization codes as a NACK signal, and a transmitter for sending said ACK and NACK signal codes to said UE; and said UE having:

a receiver for receiving the ACK and NACK signal codes; and a storage for storing the ACK and NACK signal codes for subsequent use.

6. The apparatus of claim 5 wherein said channelization code provider provides sixteen (16) different channelization codes.

7. The apparatus of claim 5 further comprising:

said base station transmitter further configured to transmit a burst to said at least one UE;

said BS having a storage for temporarily storing the burst;

said UE receiver configured to receive the burst;

said UE having an error detector for determining whether the transmitted burst contains an error; and said UE having a transmitter for transmitting the channelization code assigned to the UE as an ACK signal in the case the error detector does not detect an error, and for transmitting the channelization code assigned to the UE as a NACK signal in the case the error detector detects an error.

8. The apparatus of claim 7 further comprising:

said base station having a receiver for receiving the code sent by the UE; and said BS having a code detector for determining whether the received code is an ACK or a NACK;

whereby in the case of an ACK the burst is discarded from the BS storage; and in the case of a NACK the burst is retransmitted.

* * * * *